United States Patent
Goodman

(10) Patent No.: US 7,054,785 B2
(45) Date of Patent: May 30, 2006

(54) METHODS AND SYSTEMS FOR ANALYZING FLUTTER TEST DATA USING NON-LINEAR TRANSFER FUNCTION FREQUENCY RESPONSE FITTING

(75) Inventor: Charles E. Goodman, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 10/606,067

(22) Filed: Jun. 24, 2003

(65) Prior Publication Data

US 2004/0267497 A1    Dec. 30, 2004

(51) Int. Cl.
*G06F 13/10* (2006.01)

(52) U.S. Cl. .................. 702/179; 702/181; 702/183; 702/189

(58) Field of Classification Search .......... 702/114, 702/159, 179, 181, 183, 189; 324/600; 342/357.04; 700/29; 701/11
See application file for complete search history.

(56) References Cited

U.S. PATENT DOCUMENTS

| | | | | |
|---|---|---|---|---|
| 5,444,641 | A | * | 8/1995 | White ......................... 702/65 |
| 5,475,793 | A | | 12/1995 | Broomhead et al. .......... 395/20 |
| 5,640,330 | A | | 6/1997 | Cooper et al. .............. 364/496 |
| 5,819,188 | A | | 10/1998 | Vos ............................... 701/4 |
| 6,216,063 | B1 | | 4/2001 | Lind et al. ..................... 701/3 |
| 6,246,929 | B1 | * | 6/2001 | Kaloust ....................... 701/11 |
| 6,253,120 | B1 | | 6/2001 | Shimada et al. ............ 700/266 |
| 6,268,824 | B1 | * | 7/2001 | Zhodzishky et al. ... 342/357.04 |
| 2004/0009063 | A1 | * | 1/2004 | Polacsek ........................ 416/1 |
| 2004/0202049 | A1 | * | 10/2004 | Breed et al. ................. 367/138 |

* cited by examiner

*Primary Examiner*—Marc S. Hoff
*Assistant Examiner*—Felix Suarez
(74) *Attorney, Agent, or Firm*—Lee & Hayes, PLLC

(57) ABSTRACT

Methods and systems for analyzing flutter test data using non-linear transfer function frequency response fitting are provided. In one embodiment, a plurality of data points are read, with each data point representing a motion of an aeroelastic structure (e.g. an aircraft surface) at a different location. A closed form fit to the plurality of data points is performed to obtain an initial curve fit condition. At least one non-linear transfer function frequency response curve fit is then performed to the plurality of data points.

22 Claims, 17 Drawing Sheets

FIG. 2

| FIG. 2A | FIG. 2B | FIG. 2C | FIG. 2D | FIG. 2E | FIG. 2F | FIG. 2G | FIG. 2H |

$$\frac{\partial \text{Gain}}{\partial x} = \frac{\partial \ (\ W/N_g\ 20.0\ \log_{10}(|Z|)\ )}{\partial x} \quad (2\text{-}1)$$

$$\frac{\partial \text{Phase}}{\partial x} = \frac{\partial \ (\ W/N_p\ (180.0/\pi)\ \tan^{-1}(\text{Im}(Z)/\text{Re}(Z))\ )}{\partial x} \quad (2\text{-}2)$$

Where:  Gain = gain of transfer function response in dB
Phase = phase of transfer function response in degrees
W = frequency dependent weighting
$N_g$ = gain normalization
$N_p$ = phase normalization
Z = complex transfer function frequency response
x = design variable Since: $|Z| = \sqrt{Z\ Z^*}$ $\log_{10}(u) = \log_{10}(e)\ \ln(u)$ Gives: $20.0\log_{10}(|Z|) = 10.0\log_{10}(e)\ln(Z\ Z^*)$ Then: $\dfrac{\partial \text{Gain}}{\partial x} = \dfrac{\partial\ (\ W/N_g = 10.0\log_{10}(e)\ \ \ln(Z\ Z^*)}{\partial x}$

*FIG. 2A*

Since:
$$\frac{\partial \ln(u)}{\partial x} = \frac{1.0}{u} \frac{\partial u}{\partial x}$$

$$\frac{\partial \tan^{-1}(u)}{\partial x} = \frac{1.0}{1.0+u^2} \frac{\partial u}{\partial x}$$

Then:
$$\frac{\partial \text{Gain}}{\partial x} = N_g \frac{10.0 \log_{10}(e)}{(\text{Re}(Z)^2 + \text{Im}(Z)^2)} \frac{\partial (\text{Re}(Z)^2 + \text{Im}(Z)^2)}{\partial x}$$

$$\frac{\partial \text{Phase}}{\partial x} = N_p \frac{(180.0/\pi) \text{Re}(Z)^2}{(\text{Re}(Z)^2 + \text{Im}(Z)^2)} \frac{\partial (\text{Im}(Z)/\text{Re}(Z))}{\partial x}$$

Since:
$$\frac{\partial (u/v)}{\partial x} = \frac{1.0}{v^2}\left(v\frac{\partial u}{\partial x} - u\frac{\partial v}{\partial x}\right)$$

Gives:
$$\frac{\partial \text{Gain}}{\partial x} = N_g \frac{20.0 \log_{10}(e)}{(\text{Re}(Z)^2 + \text{Im}(Z)^2)} \left(\text{Re}(Z)\frac{\partial \text{Re}(Z)}{\partial x} + \text{Im}(Z)\frac{\partial \text{Im}(Z)}{\partial x}\right)$$

$$\frac{\partial \text{Phase}}{\partial x} = N_p \frac{(180.0/\pi)}{(\text{Re}(Z)^2 + \text{Im}(Z)^2)} \left(\text{Re}(Z)\frac{\partial \text{Im}(Z)}{\partial x} + \text{Im}(Z)\frac{\partial \text{Re}(Z)}{\partial x}\right)$$

*FIG. 2B*

There is similarity between the partial of the gain of the response and that of the phase. To uncover the similarity, examine Equation (2-3):

$$\frac{1.0}{z}\frac{\partial z}{\partial x} = \frac{1.0}{Re(Z)+Im(z)j}\left(\frac{\partial Re(Z)}{\partial x} + \frac{\partial Im(Z)}{\partial x}j\right) \quad (2\text{-}3)$$

Gives:

$$\frac{1.0}{z}\frac{\partial z}{\partial x} = \frac{1.0}{(Re(Z)^2+Im(Z)^2)}\left(Re(Z)\frac{\partial Re(Z)}{\partial x} + Im(Z)\frac{\partial Im(Z)}{\partial x}\right) + \quad (2\text{-}4)$$

$$\frac{1.0}{(Re(Z)^2+Im(Z)^2)}\left(Re(Z)\frac{\partial Im(Z)}{\partial x} - Im(Z)\frac{\partial Re(Z)}{\partial x}\right)j \quad (2\text{-}5)$$

Combining the results from Equations (2-1), (2-2) and (2-3) yield Equations (2-4) and (2-5):

$$\frac{\partial Gain}{\partial x} = 20.0\log_{10}(e) \; Re\left(\frac{1.0}{z}\frac{\partial z}{\partial x}\right) = N_g$$

$$\frac{\partial Phase}{\partial x} = (180.0/\pi) \; Im\left(\frac{1.0}{z}\frac{\partial z}{\partial x}\right) = N_p$$

*FIG. 2C*

The complex response of the block diagonal SSM for a specific transfer function is given by Equation (2-6):

$$z_{ij} = \Sigma \left( \frac{N_{ij}^l}{D^l} \right) + d_{ij} \qquad (2-6)$$

Where: $N_{ij}^l = ( c_{i1}^l b_{1j}^l + c_{i2}^l b_{2j}^l ) s +$
$( c_{i2}^l b_{1j}^l a_{21}^l - c_{i1}^l b_{1j}^l a_{22}^l + c_{i1}^l b_{2j}^l )$ $$D^l = s^2 - a_{22}^l s - a_{21}^l$$

For elements in the D matrix the unknown term in Equations (2-4) and (2-5) is given by Equation (2-7) using Equation (2-6):

$$\frac{\partial z_{ij}}{\partial d_{ij}} = 1.0 \qquad (2-7)$$

For elements in the A, B or C matrices, x1, the unknown term in Equations (2-4) and (2-5) is given by Equation (2-8):

$$\frac{\partial z_{ij}}{\partial x^l} = \frac{\partial ( N_{ij}^l / D_l )}{\partial x^l} \qquad (2-8)$$

*FIG. 2D*

Since: $\dfrac{\partial(u/v)}{\partial x} = \dfrac{1.0}{v^2}\left( v\dfrac{\partial u}{\partial x} - u\dfrac{\partial v}{\partial x} \right)$ Then: $\dfrac{\partial z_{ij}{}^1}{\partial x^1} = \dfrac{1.0}{D^1 D^1}\left( D^1 \dfrac{\partial N_{ij}{}^1}{\partial x^1} - N_{ij}{}^1 \dfrac{\partial D^1}{\partial x^1} \right)$ And thus: $\dfrac{\partial D^1}{\partial c_{i1}{}^1} = \dfrac{\partial D^1}{\partial c_{i2}{}^1} = \dfrac{\partial D^1}{\partial b_{1j}{}^1} = \dfrac{\partial D^1}{\partial b_{2j}{}^1} = 0.0$ Simplified: $\dfrac{\partial z_{ij}{}^1}{\partial x^1} = \dfrac{1.0}{D^1}\left( \dfrac{\partial N_{ij}{}^1}{\partial x^1} \right)$ for $x^1 = c_{i1}{}^1, c_{i2}{}^1, b_{1j}{}^1, b_{2j}{}^1$ From Equation (2-6) the non-zero partials of the block numerator and denominator are given as Equations (2-9) through (2-16):

$\dfrac{\partial N_{ij}{}^1}{\partial c_{i1}{}^1} = b_{1j}{}^1 s + ( b_{2j}{}^1 - b_{1j}{}^1 a_{22}{}^1 )$ \hfill (2-9)

$\dfrac{\partial N_{ij}{}^1}{\partial c_{i2}{}^1} = b_{2j}{}^1 s + ( b_{1j}{}^1 a_{21}{}^1 )$ \hfill (2-10)

*FIG. 2E*

$$\frac{\partial N_{ij}^1}{\partial b_{ij}^1} = c_{i1}^1 s + (c_{i2}^1 a_{21}^1 - c_{i1}^1 a_{22}^1) \quad (2\text{-}11)$$

$$\frac{\partial N_{ij}^1}{\partial b_{2j}^1} = c_{i2}^1 s + (c_{i1}^1) \quad (2\text{-}12)$$

$$\frac{\partial N_{ij}^1}{\partial a_{21}^1} = c_{i2}^1 b_{1j}^1 \quad (2\text{-}13)$$

$$\frac{\partial N_{ij}^1}{\partial a_{22}^1} = -c_{i1}^1 b_{1j}^1 \quad (2\text{-}14)$$

$$\frac{\partial D^1}{\partial a_{21}^1} = -1.0 \quad (2\text{-}15)$$

$$\frac{\partial D^1}{\partial a_{22}^1} = -s \quad (2\text{-}16)$$

*FIG. 2F*

To summarize from Equations (2-4) through (2-16) as Equations (2-17) through (2-30):

$$\frac{\partial Gain_{ij}^1}{\partial a_{21}^1} = W\ 20.0\log_{10}(e)\ Re\left(\frac{D^1 c_{i2}^1 b_{1j}^1 + N_{ij}^1}{D^1 D^1 z_{ij}}\right) \quad (2\text{-}17)$$

$$\frac{\partial Phase_{ij}^1}{\partial a_{21}^1} = W\ (180.0/\pi)\ Im\left(\frac{D^1 c_{i2}^1 b_{1j}^1 + N_{ij}^1}{D^1 D^1 z_{ij}}\right) \quad (2\text{-}18)$$

$$\frac{\partial Gain_{ij}^1}{\partial a_{22}^1} = W\ 20.0\log_{10}(e)\ Re\left(\frac{-D^1 c_{i1}^1 b_{1j}^1 + N_{ij}^1 s}{D^1 D^1 z_{ij}}\right) \quad (2\text{-}19)$$

$$\frac{\partial Phase_{ij}^1}{\partial a_{22}^1} = W\ (180.0/\pi)\ Im\left(\frac{-D^1 c_{i1}^1 b_{1j}^1 + N_{ij}^1 s}{D^1 D^1 z_{ij}}\right) \quad (2\text{-}20)$$

$$\frac{\partial Gain_{ij}^1}{\partial b_{1j}^1} = W\ 20.0\log_{10}(e)\ Re\left(\frac{c_{i1}^1 s + c_{i2}^1 a_{21}^1 - c_{i1}^1 a_{22}^1}{D^1 z_{ij}}\right) \quad (2\text{-}21)$$

$$\frac{\partial Phase_{ij}^1}{\partial b_{1j}^1} = W\ (180.0/\pi)\ Im\left(\frac{c_{i1}^1 s + c_{i2}^1 a_{21}^1 - c_{i1}^1 a_{22}^1}{D^1 z_{ij}}\right) \quad (2\text{-}22)$$

$$\frac{\partial Gain_{ij}^1}{\partial b_{2j}^1} = W\ 20.0\log_{10}(e)\ Re\left(\frac{c_{i2}^1 s + c_{i1}^1}{D^1 z_{ij}}\right) \quad (2\text{-}23)$$

FIG. 2G $$\frac{\partial \text{Phase}_{ij}}{\partial b_{2j}^1} = W\,(180.0/\pi)\,\text{Im}\left(\frac{c_{i2}^1 s + c_{i1}^1}{D^1 z_{ij}}\right) \frac{1}{N p_{ij}} \quad (2\text{-}24)$$

$$\frac{\partial \text{Gain}_{ij}}{\partial c_{i1}^1} = W\,20.0\log_{10}(e)\,\text{Re}\left(\frac{b_{1j}^1 s + b_{2j}^1 - b_{1j}^1 a_{22}^1}{D^1 z_{ij}}\right) \frac{1}{N g_{ij}} \quad (2\text{-}25)$$

$$\frac{\partial \text{Phase}_{ij}}{\partial c_{i1}^1} = W\,(180.0/\pi)\,\text{Im}\left(\frac{b_{1j}^1 s + b_{2j}^1 - b_{1j}^1 a_{22}^1}{D^1 z_{ij}}\right) \frac{1}{N p_{ij}} \quad (2\text{-}26)$$

$$\frac{\partial \text{Gain}_{ij}}{\partial c_{i2}^1} = W\,20.0\log_{10}(e)\,\text{Re}\left(\frac{b_{2j}^1 s + b_{1j}^1 a_{21}^1}{D^1 z_{ij}}\right) \frac{1}{N g_{ij}} \quad (2\text{-}27)$$

$$\frac{\partial \text{Phase}_{ij}}{\partial c_{i2}^1} = W\,(180.0/\pi)\,\text{Im}\left(\frac{b_{2j}^1 s + b_{1j}^1 a_{21}^1}{D^1 z_{ij}}\right) \frac{1}{N p_{ij}} \quad (2\text{-}28)$$

$$\frac{\partial \text{Gain}_{ij}}{\partial d_{ij}} = W\,20.0\log_{10}(e)\,\text{Re}\left(\frac{1.0}{z_{ij}}\right) \frac{1}{N g_{ij}} \quad (2\text{-}29)$$

$$\frac{\partial \text{Phase}_{ij}}{\partial d_{ij}} = W\,(180.0/\pi)\,\text{Im}\left(\frac{1.0}{z_{ij}}\right) \frac{1}{N p_{ij}} \quad (2\text{-}30)$$

| FIG. 3A | FIG. 3B | FIG. 3C | FIG. 3D |

The complex response of the PZM is given by Equation (3-1):

$$Z = \frac{N}{D} = \frac{TFG \; \Pi \; N^1}{\Pi \; D^1} \quad (3\text{-}1)$$

Where: $N^1 = s^2 + b_1^1 s + b_0^1$
$D^1 = s^2 + a_1^1 s + a_0^1$

The unknown term in Equations (2-4) and (2-5) is given by Equations (3-2) by using Equation (3-1):

$$\frac{1.0}{Z} \frac{\partial Z}{\partial x} = \frac{1.0}{D \, N} \left( D \frac{\partial N}{\partial x} - N \frac{\partial D}{\partial x} \right) \quad (3\text{-}2)$$

The results of Equation (3-2) when the transfer function gain is the design variable, x, is given by the Equation (3-3):

$$\frac{1.0}{Z} \frac{\partial Z}{\partial x} = \frac{1.0}{TFG} \quad \text{when } x = TFG \quad (3\text{-}3)$$

*FIG. 3A*

The results of Equation (3-2) when the a numerator block coefficient is the design variable, x, is given by the Equation (3-4):

$$\frac{1.0}{Z}\frac{\partial Z}{\partial x} = \frac{1.0}{N}\left(\frac{\partial N}{\partial x}\right) = \frac{1.0}{N^1}\frac{\partial N^1}{\partial x} \quad \text{when } x = b_1^1 \text{ or } b_0^1 \quad (3-4)$$

Gives:

$$\frac{1.0}{Z}\frac{\partial Z}{\partial x} = \frac{1.0}{N^1}s \quad \text{when } x = b_1^1$$

$$\frac{1.0}{Z}\frac{\partial Z}{\partial x} = \frac{1.0}{N^1} \quad \text{when } x = b_0^1$$

The results of Equation (3-2) when the a denominator block coefficient is the design variable, x, is given by the Equation (3-5):

$$\frac{1.0}{Z}\frac{\partial Z}{\partial x} = -\frac{1.0}{D}\left(\frac{\partial D}{\partial x}\right) = -\frac{1.0}{D^1}\frac{\partial D^1}{\partial x} \quad \text{when } x = a_1^1 \text{ or } a_0^1 \quad (3-5)$$

Gives:

$$\frac{1.0}{Z}\frac{\partial Z}{\partial x} = -\frac{1.0}{D^1}s \quad \text{when } x = a_1^1$$

$$\frac{1.0}{Z}\frac{\partial Z}{\partial x} = -\frac{1.0}{D^1} \quad \text{when } x = a_0^1$$

*FIG. 3B*

To summarize from Equations (2-4), (2-5), (3-3), (3-4) and (3-5) as Equations (3-6) through (3-15):

$$\frac{\partial \text{Gain}}{\partial \text{TFG}} = W \; 20.0 \; \log_{10}(e) \; \frac{1.0}{\text{TFG}} \quad (3\text{-}6)$$

$$\frac{\partial \text{Phase}}{\partial \text{TFG}} = 0.0 \quad (3\text{-}7)$$

$$\frac{\partial \text{Gain}}{\partial b_1^1} = W \; 20.0 \; \log_{10}(e) \; \text{Re}\left(\frac{s}{N^1}\right) \quad (3\text{-}8)$$

$$\frac{\partial \text{Phase}}{\partial b_1^1} = W \; (180.0/\pi) \; \text{Im}\left(\frac{s}{N^1}\right) \quad (3\text{-}9)$$

$$\frac{\partial \text{Gain}}{\partial b_0^1} = W \; 20.0 \; \log_{10}(e) \; \text{Re}\left(\frac{1.0}{N^1}\right) \quad (3\text{-}10)$$

FIG. 3C $$\frac{\partial \text{Phase}}{\partial b_0^1} = \frac{W(180.0/\pi)}{N_p} \text{Im}\left(\frac{1.0}{N^1}\right) \quad (3\text{-}11)$$

$$\frac{\partial \text{Gain}}{\partial a_1^1} = \frac{W\, 20.0\, \log_{10}(e)}{N_g} \text{Re}\left(\frac{-s}{D^1}\right) \quad (3\text{-}12)$$

$$\frac{\partial \text{Phase}}{\partial a_1^1} = \frac{W(180.0/\pi)}{N_p} \text{Im}\left(\frac{-s}{D^1}\right) \quad (3\text{-}13)$$

$$\frac{\partial \text{Gain}}{\partial a_0^1} = \frac{W\, 20.0\, \log_{10}(e)}{N_g} \text{Re}\left(\frac{-1.0}{D^1}\right) \quad (3\text{-}14)$$

$$\frac{\partial \text{Phase}}{\partial a_0^1} = \frac{W(180.0/\pi)}{N_p} \text{Im}\left(\frac{-1.0}{D^1}\right) \quad (3\text{-}15)$$

*FIG. 3D*

METHODS AND SYSTEMS FOR ANALYZING FLUTTER TEST DATA USING NON-LINEAR TRANSFER FUNCTION FREQUENCY RESPONSE FITTING

FIELD OF THE INVENTION

The present invention relates generally to analyzing data and, more specifically, to analyzing flutter test data.

BACKGROUND OF THE INVENTION

In the field of aeroelasticity, the phenomenon known as flutter generally refers to a condition produced by the coalescing and proper phasing of two or more structural vibration modes of a structure, such as an aircraft wing, fuselage, empennage, or other structural component. During flight, the aerodynamic forces over such structures may cause an unstable oscillatory aeroelastic deformation of the structure referred to as flutter. Flutter of an aeroelastic structure may depend on numerous factors, including the mass, stiffness, and shape of the structure, and the particular operating conditions of the structure, including the velocity and density of the airstream.

Flutter of an aircraft wing may involve both bending and torsional types of motion. In some cases, the aeroelastic deformations may be relatively mild and stable within the normal operating envelope of the aircraft. In the case of flutter, however, the aeroelastic deformations are driven into an unstable mode in which the torsional motion extracts energy from the airstream and drives the bending mode to increasingly higher amplitudes, causing oscillations of increasing amplitude that eventually result in catastrophic failure of the structure.

The avoidance of the unstable condition of flutter and the determination of the maximum allowable flight speed before flutter is encountered are critical priorities for designers of aeroelastic structures and aerospace vehicles. Exhaustive flight and wind tunnel tests are usually conducted to record and observe the flutter characteristics of the various aeroelastic structures of an aircraft over the entire operating envelope of the aircraft. For military aircraft, the attachment of external stores to the aircraft further complicates the analysis and increases the extent and complexity of the testing due to the multiple store configurations dictated by modern combat, surveillance, and fuel capacity requirements. These differences in store number, type, and mounting location give rise to complex multi-variable oscillation coupling patterns, and can give an aircraft as many different flutter speeds as there are store configurations.

The acquisition and analysis of flutter test data may be difficult and expensive, particularly when considerable flight testing is involved. The two principal methods of acquiring flutter flight test data are so-called dwell and decay tests, and sine sweep (or frequency response) tests. The transfer function frequency response data are generally used to identify frequency areas of interest to be investigated further with dwell and decay time history methods. The flight time required for the dwell and decay method is extensive compared with the flight time required to obtain the frequency response data. Although desirable results have been achieved using the previously existing test and analysis methods, the complexity of aeroelastic flutter and the continuing advances in aerospace vehicle requirements are placing increasing demands on those who design and analyze flutter test data of aeroelastic structures. Therefore, there is an unmet need for improved methods of analyzing flutter test data, particularly those which may provide improved results or which may reduce the required amount of flight testing.

SUMMARY OF THE INVENTION

The present invention is directed to methods and systems for analyzing of flutter test data using non-linear transfer function frequency response fitting. Embodiments of methods and systems in accordance with the present invention may advantageously provide improved characterization of flutter test data, may provide improved computational efficiency and reduced costs, and may significantly decrease the amount of flight testing required in comparison with prior art methods.

In one embodiment, analyzing flutter test data includes reading a plurality of data points, each data point representing a motion of an aeroelastic structure (e.g. an aircraft surface) at a different location. A closed form fit to the plurality of data points is performed to obtain an initial curve fit condition. At least one non-linear transfer function frequency response curve fit is then performed to the plurality of data points.

BRIEF DESCRIPTION OF THE DRAWINGS

The preferred and alternative embodiments of the present invention are described in detail below with reference to the following drawings.

FIG. 2 is a mathematical derivation of a set of analytically-derived sensitivities for a State Space Model in accordance with an embodiment of the present invention;

FIG. 3 is a mathematical derivation of a set of analytically-derived sensitivities for a Pole Zero Model in accordance with another embodiment of the present invention;

DETAILED DESCRIPTION OF THE INVENTION

The present invention relates to methods of analyzing of flutter test data using non-linear transfer function frequency response fitting. Many specific details of certain embodiments of the invention are set forth in the following description and in FIGS. 1–5 to provide a thorough understanding of such embodiments. One skilled in the art, however, will understand that the present invention may have additional embodiments, or that the present invention may be practiced without several of the details described in the following description.

Analyzing flutter test data in accordance with embodiments of the present invention may involve non-linear optimization to fit a transfer function frequency response to a set of test data to provide an improved characterization of the natural frequency and damping characteristics for each mode of the fit. Embodiments in accordance with the present invention may overcome several disadvantages of the prior art analysis methods while providing an efficient method to fit the gain and phase of transfer function frequency response data. Methods in accordance with the present invention may also allow an analyst to increase a number of modes in the fit with relative ease to improve the fit with the experimental data, thereby allowing improved fitting capability.

Figure 1:
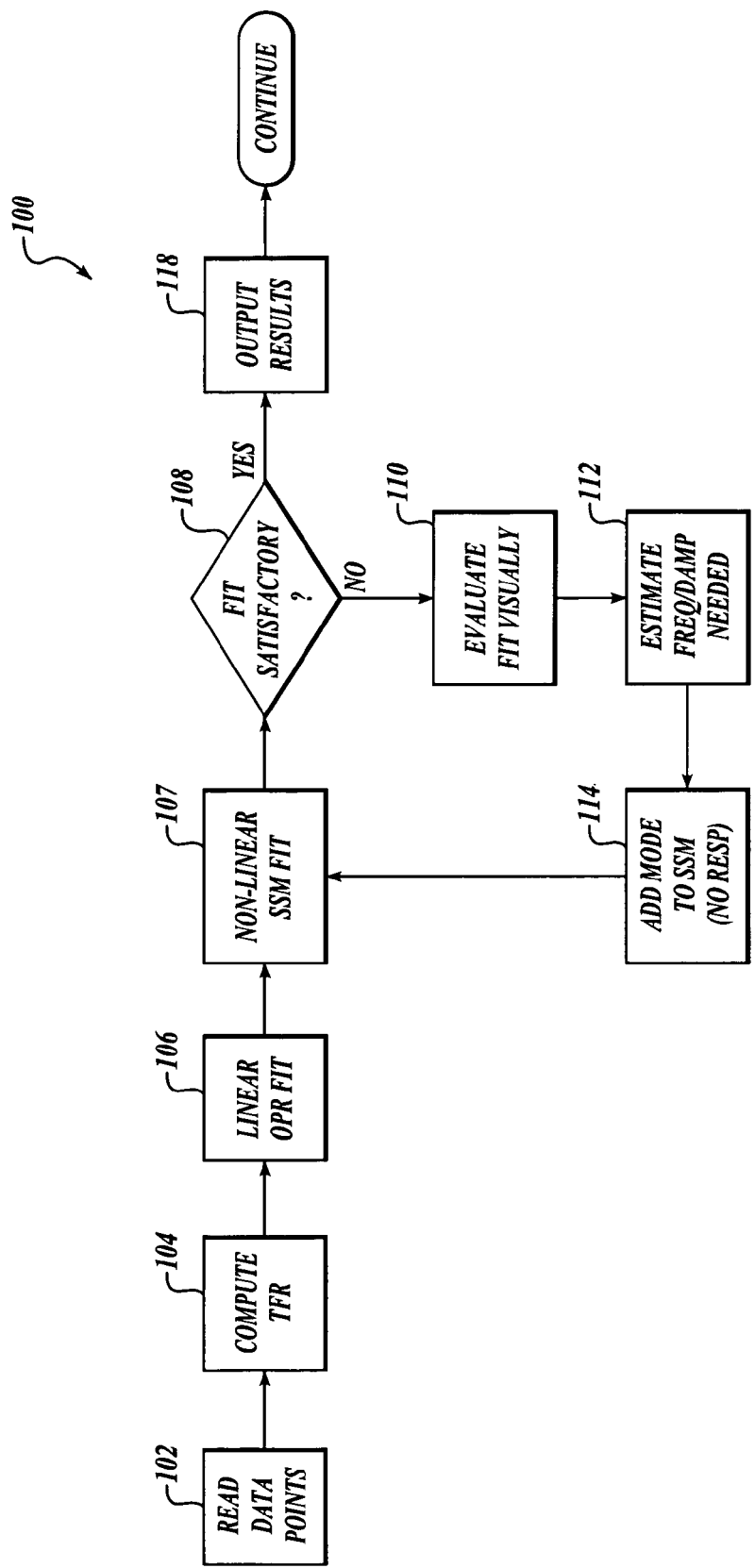
FIG. 1 is a flowchart showing a process for fitting a flutter frequency response data set using non-linear transfer function frequency response fitting in accordance with an embodiment of the present invention.

FIG. 1 is a flowchart showing a process 100 for fitting a flutter time history data set using non-linear transfer function frequency response fitting in accordance with an embodiment of the present invention. In this embodiment, the process 100 begins by reading a plurality of test data points at a block 102. In a particular embodiment, the plurality of test data points may represent flutter test data, and each data point may represent an amplitude value at a given test time.

At a block 104, the plurality of test data points are transformed into a transfer function frequency response (TFR). Well established methods are used to compute the TFR from the measured test data. As described more fully below, the process 100 shown in FIG. 1 then fits the transformed data with a State Space Model (SSM) as defined by Equations (1) and (2). A complex response of the SSM is defined by Equation (3), and the Gain and Phase of that complex response is computed with Equations (4) and (5), as follows:

$$x = Ax + Bu \quad (1)$$

$$y = Cx + Du \quad (2)$$

$$H(s) = C(sI - A)^{-1}B + D \quad (3)$$

where
 x=mode or state matrix
 u=matrix of system inputs
 y=matrix of sensor outputs
 H(s)=transfer function frequency response
 s=Laplace variable
 I=identity matrix, and
 B, C, D=coefficient matrices $$A = \text{state matrix of aeroelastic modes}$$

$$= \begin{bmatrix} A_{1,1} & & & \\ & A_{2,2} & & \\ & & \ddots & \\ & & & A_{n,n} \end{bmatrix}$$

$$A_{i,i} = \text{aeroelastic modes}$$

$$= \begin{bmatrix} 0 & 1 \\ -\omega^2 & -\xi\omega \end{bmatrix}$$

Ω=frequency of oscillation
ξ=viscous damping
and where $$G(s) = 20 \log_{10}(H(s)) \quad (4)$$

$$P(s) = \tan^{-1}(Im(H(s))/Re(H(s))) \quad (5)$$

where Re(H(s))=real component of H(s)
Im(H(s))=imaginary component of H(s)

With continued reference to FIG. 1, the process 100 may then perform a linear optimization (or closed form) fit of the data at a block 106. In one embodiment, the closed form fit is performed using a well-known orthogonal polyreference (OPR) technique. In an alternate embodiment, a known predictor-corrector fit technique may be used. The closed form fit of the block 106 provides only an approximate initial fit of the response data. In some cases, for example, the closed form fit of block 106 may be so approximate that it may even predict unstable modes which are known to not exist.

Using the closed-form fit as an initial condition, a non-linear optimization fit is applied to the State Space Model (SSM) at a block 107. In one embodiment, a function that is minimized during the optimization is a sum of the squares of the residuals, where the residuals are defined by an error in the gain G and phase P fit curves. In one particular aspect of the present invention, the non-linear optimization fit of the block 107 may utilize analytically-derived sensitivities, as described more fully below. The analytically-derived sensitivities may be computed directly from the data, rather than be computed by differences using repeated function evaluations. Because the sensitivities are computed directly, the speed of the convergence of the non-linear optimization may be greatly improved.

As further shown in FIG. 1, an evaluation of the fit of the response data is performed at a block 108. The evaluation may be performed manually by an analyst viewing a comparison plot of the closed form curve fit with the test data on a control monitor, or alternately, may be performed in any suitable automated or semi-automated manner. In a particular embodiment, an error function is computed and evaluated to determine whether the curve fit is acceptable and accurate.

If the evaluation of the fit is determined to be unsatisfactory at the block 108, a visual evaluation of the fit may be performed at a block 110. At this stage, the analyst may determine whether to vary any parameters involved in the curve fit routine in an attempt improve the curve fit characteristics. A pre-determined number of iterations in the non-linear fit are typically set by the analyst, and the convergence of the residuals may be evaluated manually. Alternately, an automated convergence criteria could also be used. One a converged fit is obtained, a determination of the adequacy of the SSM is made. During the determination of block 108, two issues may be addressed. The first issue may be the presence of one or more peaks in the resonse data not modeled by the SSM. The other issue may be large errors in the Gain (e.g. greater than 4 dB) and/or the Phase (e.g. greater than 8 degrees).

Next, an estimate of the frequency and damping of the mode needed for the next non-linear fit is performed at a block 112. At a block 114, the analyst may optionally add (or remove) aeroelastic modes to (or from) the matrix A in an attempt to improve the fit. When a peak is present in the response data and is not modeled by the SSM, the frequency for the mode is estimated by the frequency where the peak appears. A fairly low damping value is used for the estimate (e.g. ξ=0.01). When large errors are present, the frequency estimate for the mode is the frequency at which the maximum error occurs. In this case, a larger damping value is chosen (e.g. ξ=0.1). The additional mode may be added in such a way as to not dramatically change the response of the fit equation, but rather, to incrementally expand the fit equation to allow an improved fit with the data during subsequent non-linear fit operations (block 107).

As further shown in FIG. 1, after the non-linear optimization fit of the data at the block 107, the process 100 may return to the decision block 108 to determine whether the curve fit is satisfactory. If the curve fit is not satisfactory, the blocks 110 through 114 and 1076 may be repeated to attempt to improve the fit. Once a satisfactory fit is achieved, the process 100 may proceed to output the results of the curve fit at a block 118, and may then continue or terminate as appropriate.

As mentioned above, the non-linear optimization fit at the block 107 may utilize analytically-derived sensitivities (or partials) of the Gain G and Phase P variables, known as the Jacobian matrix A. This matrix may be populated using analytically-derived sensitivities that may be computed directly from the data. The Jacobian is a matrix of partial differentials of the residuals (row) with respect to each of the design variables (column). The residuals may be organized as follows: the gain error (dB) for the first frequency then the phase error (degrees), repeated for each frequency. The design variables may be organized as follows: the two terms ($-\omega^2$ and $-\xi\omega$) from each of the aeroelastic mode blocks ($A_{i,j}$) of the state matrix A, all terms in the input matrix B, all terms in the output matrix C, and all terms in the feed through matrix D. The partials for the PZM non-linear fit are derived much in the same way as for the SSM non-linear fits.

For example, FIG. 2 is a mathematical derivation of a set of analytically-derived sensitivities for a State Space Model (SSM) in accordance with an embodiment of the present invention. As shown Equations (2-1) and (2-2) in FIG. 2, the analytically-derived sensitivities may be determined by taking the partial derivatives of the Gain G and Phase P with respect to the state matrix x, with the Gain G and Phase P from Equations (2) and (3) above recast in terms of the complex transfer function frequency response Z. Following the derivation shown FIG. 2, the analytically-derived sensitivities for the State Space Model (SSM) are provided by Equations (2-17) through (2-30) of FIG. 2, and may be input into the Jacobian matrix to perform the non-linear curve fitting of the test data using the SSM in block 107.

An advantage of analyzing flutter test data using analytically-derived sensitivities to populate the Jacobian matrix is that computational efficiencies are greatly increased compared with alternate methods. For example, populating the Jacobian matrix using analytically-derived sensitivities (Equations (2-17) through (2-30)) may significantly reduce the computation speed required for each non-linear fit iteration by a factor of 3 compared with alternate methods of populating the Jacobian matrix which rely upon repeated differencing and repeated calls to function evaluations. This advantageously improves the computational speed and reduces the cost associated with flutter test data analysis.

In yet another alternate embodiment, the non-linear optimization of the block 107 may be performed using a Pole Zero Model (PZM) (rather than a SSM). Generally, the PZM employs a ratio of Laplace polynomials to model a Single Input Single Output (SISO) transfer function. The polynomials may be expressed as a series of second order blocks instead of as a single polynomial. For the PZM method, the residuals are organized as follows: the gain error (dB) for the first frequency (or mode), then the phase error (degrees), repeated for each frequency. The design variables are organized as follows: the transfer function gain; the $a_0$ term then the $a_1$ term for the first pole block, repeated for each pole block; the $b_0$ term then the $b_1$ term for the first zero block, repeated for each zero block.

Figures 3, 3A:
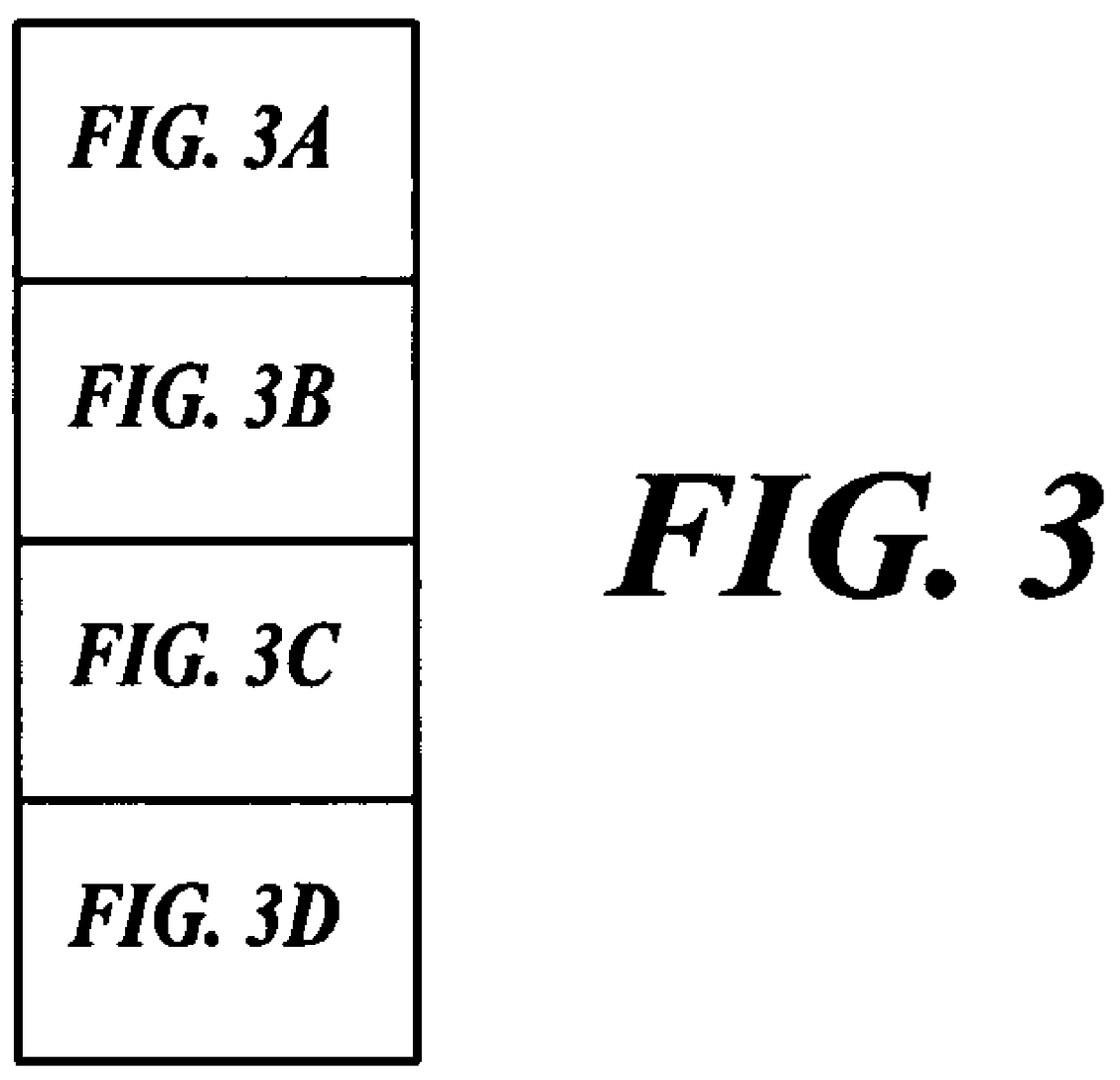

FIG. 3 is a mathematical derivation of a set of analytically-derived sensitivities for the Pole Zero Model in accordance with another embodiment of the present invention. From FIG. 3, it will be appreciated that the analytically-derived PZM sensitivities (Equations (3-6) through (3-15)) for the Jacobian matrix for the PZM non-linear fit are derived much in the same way as for the SSM non-linear fits. Again, the above-noted advantages of increased computational efficiency and reduced costs may be achieved.

Figure 4:
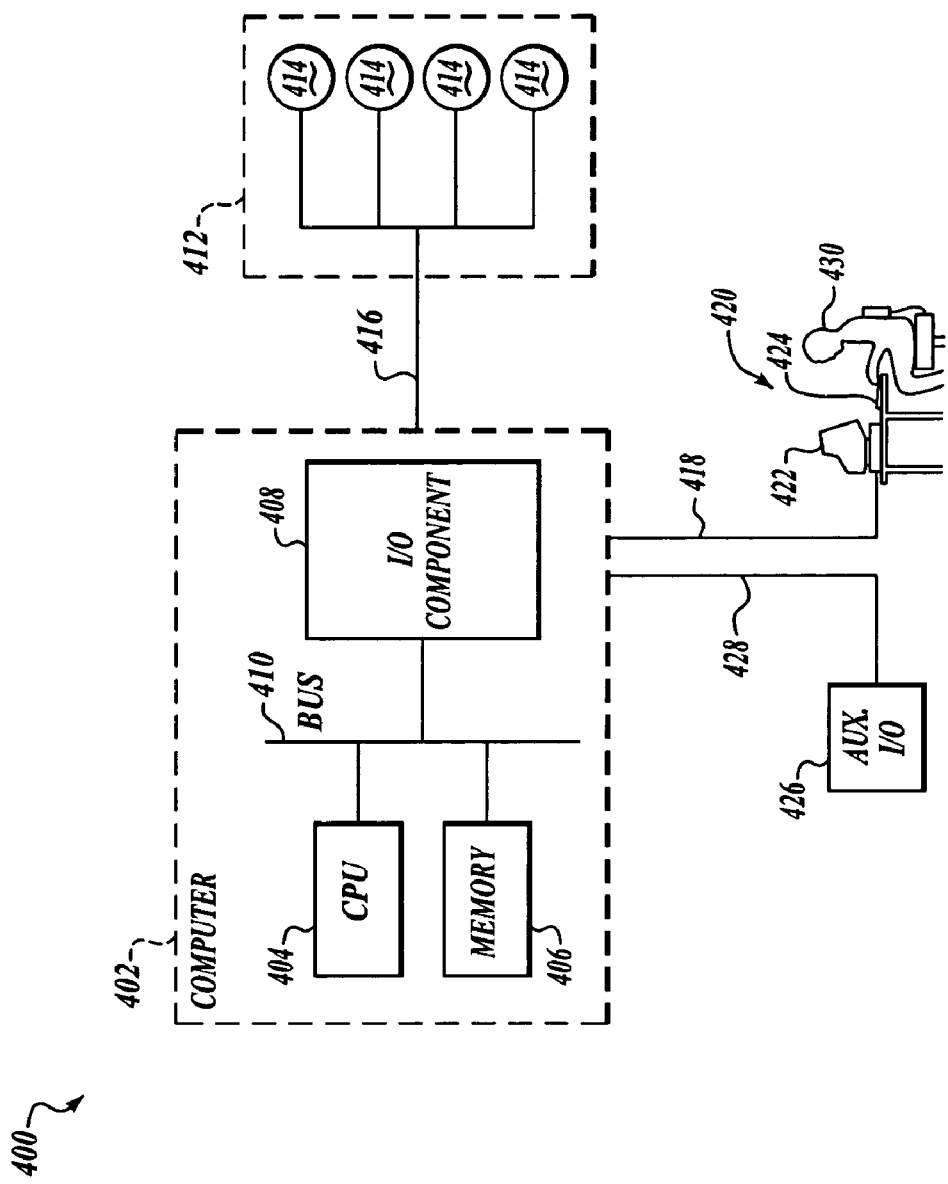
FIG. 4 is a system for analyzing flutter test data in accordance with an embodiment of the present invention.

FIG. 4 is a system 400 for analyzing flutter test data in accordance with an embodiment of the present invention. Unless otherwise specified below, the components of the system 400 are of generally-known construction, and will not be described in detail. For the sake of brevity, only significant details and aspects of the system 400 will be described. As shown in FIG. 4, in this embodiment, the system 400 includes a computer 402 having a central processing unit (CPU) 404 and a memory component 406. The memory component 406 may include one or more memory modules, such as Random Access Memory (RAM) modules, Read Only Memory (ROM) modules, Dynamic Random Access Memory (DRAM) modules, and any other suitable memory modules. The computer 402 also includes an input/output (I/O) component 408 that may include a variety of known I/O devices, including network connections, video and graphics cards, disk drives or other computer-readable media drives, displays, or any other suitable I/O modules. A data bus 410 operatively couples the CPU 404, memory component 406, and the I/O component 408.

The system 400 embodiment shown in FIG. 4 further includes a data acquisition component 412 operatively coupled to the computer 402. In this embodiment, the data acquisition component 412 includes a plurality of transducers 414 that may be arrayed on a test article for the acquisition of flutter test data. The data acquisition component 412 is operatively coupled to the computer 402 via a first communication link 416.

As further shown in FIG. 4, the system 400 further includes a control component 420 having a monitor 422 and a command input device 424 (e.g. a keyboard, an audio-visual input device, etc.). A second communication link 418 operatively couples the control component 420 to the computer 402. The system 400 also includes an auxiliary output device 426 coupled to the computer 402 by a third communication link 428. The auxiliary output device 426 may include a printer, a compact disk (CD) burner, a storage device, a communication port, or any other desired output device.

In one aspect, a machine-readable medium may be used to store a set of machine-readable instructions (e.g. a computer program) into the computer 402, wherein the machine-readable instructions embody a method of analyzing flutter test data in accordance with the teachings of the present invention. The machine-readable medium may be any type of medium which can store data that is readable by the computer 402, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the system 400, including, for example, the I/O component 408, the memory component 406, and the auxiliary output device 426. Alternately, the machine-readable instructions may be implemented directly into one or more components of the computer 402, without the assistance of the machine-readable medium.

In operation, the computer 402 may be configured to perform one or more of the aspects of the methods of analyzing flutter test data described above. For example, an operator 430 may input a command through the command input device 424 to cause the data acquisition component 412 to obtain one or more test data sets read at the block 102 (FIG. 1). The test data sets may then be communicated from the data acquisition component 412 to the computer 402. The computer 402 may be configured to perform the methods of analyzing the test data sets. For example, a set of software instructions may be stored in the computer 402 (e.g. in the memory component 406) that causes the test data sets to be read into the memory component 406 and processed using the CPU 404 in accordance with one or more methods of analyzing flutter data, including one or more of the processes described above with respect to FIGS. 1–3. Alternately, one or more aspects of the various processes described above may be implemented in the computer 402 using any suitable programmable or semi-programmable hardware components (e.g. EPROM components).

Results of the analysis in accordance with one or more embodiments of the present invention may be transmitted via the data bus 410 to the I/O component 408. The results may also be transmitted to the control component 420 and to the auxiliary output device 426 via the second and third communications links 418 and 428. The operator 430 may view the results of the analysis method(s) on the control monitor 422, and may take appropriate action, including revising analysis parameters and inputs, and continuing or repeating the one or more embodiments of analysis methods using different test data as desired.

Figure 5:
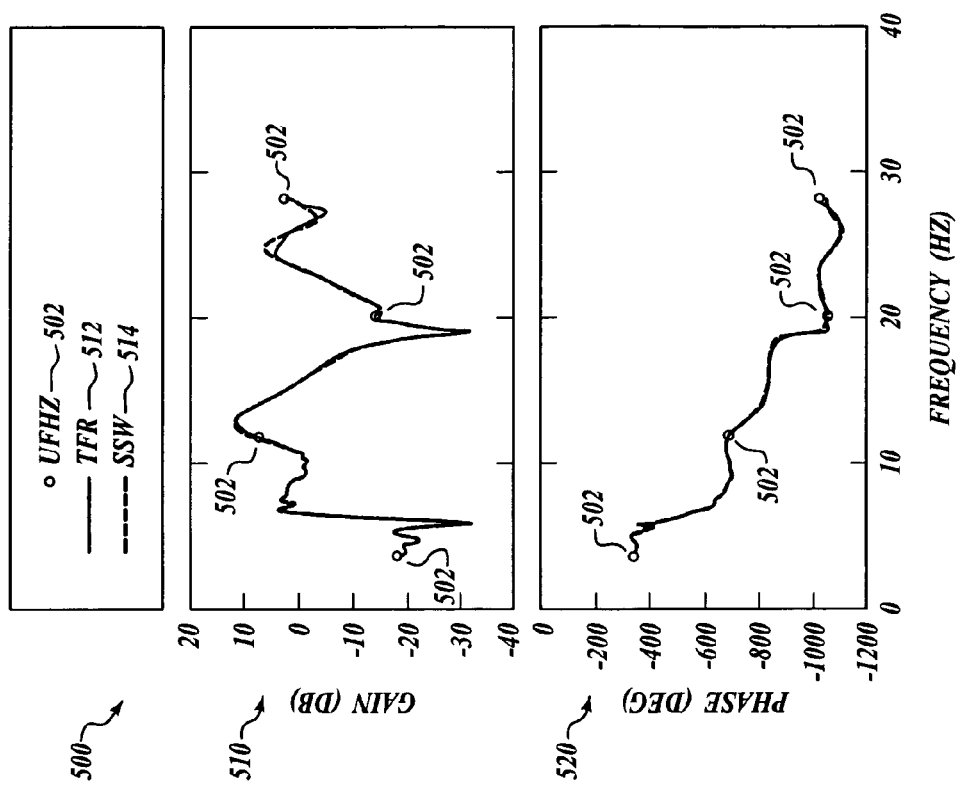
FIG. 5 is a correspondence between a representative result of a non-linear transfer function curve-fit with a representative set of test data in accordance with an embodiment of the present invention.

FIG. 5 is a correspondence between a representative result 500 of a non-linear transfer function curve-fit with a representative set of test data 502 in accordance with an embodiment of the present invention. Specifically, FIG. 5 shows a first graph 510 of gain G versus frequency, and a second graph 520 of phase P versus frequency, in which a calculated transfer function frequency response (TFR) 512 and the frequency response of a calculated SSM 514 are plotted in comparison with the test data 502. Generally, a very good fit between the calculated gain G and phase P values and the test data 502 may be noted.

Methods and systems in accordance with the present invention may provide several advantages over the prior art. For example, in the embodiments according to the present invention, the non-linear transfer function curve fit is performed in the gain and phase plane, thereby avoiding the skewing that may be experienced using prior art analysis methods, which perform the fit in the complex plan and then convert to the gain and phase plane. Another advantage is that the analyst may freely increase the number of modes in the fit without re-starting the entire analysis procedure. Unlike prior art analysis methods, the methods in accordance with the present invention enable the analyst to vary the number of modes easily and efficiently. Furthermore, the analyst may easily add more modes to improve the fit without fear of degrading the fit already achieved.

Methods in accordance with the present invention may also allow all of the measured flight tests data from multiple transducers to be fit simultaneously. This may advantageously result in modal characteristics (frequencies and dampings) that best fit all of the measured test data.

Yet another advantage is that fit methods in accordance with embodiments of the present invention may be superior to other frequency response methods available in commercial off the shelf software. The embodiments of the present invention may provide a very accurate fit with stable roots. Furthermore, the optimization may converge more quickly, especially using embodiments of the present invention that employ a Jacobian matrix that is populated with analytically computed sensitivities.

Still another advantage of the embodiments in accordance with the present invention is computational efficiency. Unlike other non-linear optimization methods, the embodiments in accordance with the present invention may exhibit improved efficiency because the need for repeated function evaluations required to get the sensitivities of the gain and phase of the response due to changes in the fit equation is reduced or eliminated.

Yet another advantage of analyzing flutter test data in accordance with embodiments of the present invention is that the amount of flight testing may be reduced. Using the disclosed methods of populating the Jacobian matrix using analytically-derived sensitivities, the flight testing required to characterize the aeroelastic modes of a structure may be reduced to performing sine sweep tests only. Thus, the need for additional flight testing to conduct dwell and decay tests to gather flutter test data to populate the Jacobian matrix A may be reduced or eliminated, resulting in significant cost savings and faster analysis schedules compared with alternate methods.

While specific embodiments of the invention have been illustrated and described herein, as noted above, many changes can be made without departing from the spirit and scope of the invention. Accordingly, the scope of the invention is not limited by the disclosure of the specific embodiments set forth above. Instead, the invention should be determined entirely by reference to the claims that follow.

What is claimed is:

1. A computer-readable medium encoded with a computer program product for analyzing test data obtained from an aeroelastic structure, the computer program product comprising:

a first computer program portion configured to read a plurality of data points, each data point representing a motion at a location on the aeroelastic structure;

a second computer program portion configured to perform a linear transfer function frequency response curve fit to the plurality of data points to obtain an initial curve fit condition; and a third computer program portion configured to perform at least one non-linear transfer function frequency response curve fit to the plurality of data points, wherein the third computer program portion is further configured to perform at least one non-linear optimization curve fit to the plurality of data points using a Jacobian matrix populated using analytically-derived sensitivities based on at least one of a State Space Model and a Pole Zero Model.

2. The computer-readable medium of claim 1, wherein reading a plurality of data points includes reading a plurality of flutter test data points.

3. The computer-readable medium of claim 1, further comprising a fourth computer program portion configured to assess an adequacy of the non-linear optimization curve fit.

4. A computer-readable medium encoded with a computer program product for analyzing test data, the computer program product comprising:

a first computer program portion configured to read a plurality of data points, each data point representing a motion at a location;

a second computer program portion configured to perform a closed form fit to the plurality of data points to obtain an initial curve fit condition; and a third computer program portion configured to perform at least one non-linear transfer function frequency response curve fit to the plurality of data points, wherein the third computer program portion is further configured to perform at least one non-linear optimization curve fit to the plurality of data points using a Jacobian matrix populated using analytically-derived sensitivities based on at least one of a State Space Model and a Pole Zero Model.

5. The computer-readable medium of claim 4, wherein plurality of flutter test data points are acquired using a plurality of sensors.

6. The computer-readable medium of claim 4, wherein the first computer program portion is further configured to read a plurality of flutter test data points acquired using a plurality of sensors.

7. The computer-readable medium of claim 4, wherein the third computer program portion is further configured to perform at least one non-linear optimization curve fit to the plurality of data points using a Jacobian matrix populated using analytically-derived sensitivities that are computed directly from the plurality of data points.

8. The computer-readable medium of claim 4, further including a fourth computer program portion configured to assess an adequacy of the non-linear optimization curve fit.

9. The computer-readable medium of claim 4, wherein the third computer program portion is further configured to determine a number of modes to include in the at least one non-linear optimization curve fit to the plurality of data points.

10. The computer-readable medium of claim 4, wherein further including a fourth computer program portion configured to transform the plurality of data points into a State Space Model.

11. The computer-readable medium of claim 4, wherein further including a fourth computer program portion configured to transform the plurality of data points into a Pole Zero Model.

12. A system for analyzing flutter test data, comprising:
a control component;
an input/output device coupled to receive a plurality of data points; and
a processor arranged to analyze the plurality of data points, the processor including:
a first component configured to read the plurality of data points, each data point representing a value at a location;
a second component configured to perform a closed form fit to the plurality of data points to obtain an initial curve fit condition; and
a third component configured to perform at least one non-linear transfer function frequency response curve fit to the plurality of data points, wherein the third component is further configured to perform at least one non-linear optimization curve fit to the plurality of data points using a Jacobian matrix populated using analytically-derived sensitivities based on at least one of a State Space Model and a Pole Zero Model.

13. The system of claim 12, wherein the input/output device is coupled to received a plurality of data points, the plurality of data points including a plurality of flutter test data points.

14. The system of claim 12, wherein the third component is further configured to perform at least one non-linear optimization curve fit to the plurality of data points using a Jacobian matrix populated using analytically-derived sensitivities.

15. The system of claim 12, wherein the third component is further configured to perform at least one non-linear optimization curve fit to the plurality of data points using a Jacobian matrix populated using analytically-derived sensitivities that are computed directly from the plurality of data points.

16. The system of claim 12, wherein the processor includes a fourth component configured to assess an adequacy of the non-linear optimization curve fit.

17. The system of claim 12, wherein at least one of the first, second, and third components is further configured to determine a number of modes to include in the at least one non-linear optimization curve fit to the plurality of data points.

18. A system for analyzing flutter test data, comprising:
a control component;
an input/output device coupled to receive a plurality of data points; and
a processor arranged to analyze the plurality of data points, the processor including:
a first component configured to read the plurality of data points, each data point representing a value at a location;
a second component configured to perform a closed form fit to the plurality of data points to obtain an initial curve fit condition;
a third component configured to perform at least one non-linear transfer function frequency response curve fit to the plurality of data points; and
a fourth component configured to transform the plurality of data points into at least one of a State Space Model and a Pole Zero Model.

19. The system of claim 18, wherein the input/output device is coupled to received a plurality of data points, the plurality of data points including a first plurality of test data points from a first test sensor, and a second plurality of test data points from a second test sensor.

20. The system of claim 18, further including a memory component operatively coupled to at least one of the control component, the input/output device, and the processor.

21. The system of claim 18, further including a data acquisition component operatively coupled to at least one of the control component, the input/output device, and the processor.

22. The system of claim 21, wherein the data acquisition component includes a plurality of data acquisition sensors.

* * * * *